United States Patent [19]
Yamaguchi et al.

[11] Patent Number: 5,401,375
[45] Date of Patent: Mar. 28, 1995

[54] ELECTRO-ENDOSMOSIS TYPE DEHYDRATOR

[75] Inventors: Mikimasa Yamaguchi; Hitomi Kawakami; Hiroshi Matsushita; Hiroshi Imanishi, all of Kanagawa, Japan

[73] Assignee: Fuji Electric Co., Ltd., Kanagawa, Japan

[21] Appl. No.: 54,880

[22] Filed: Apr. 30, 1993

Related U.S. Application Data

[63] Continuation-in-part of Ser. No. 854,475, Mar. 17, 1992, abandoned.

[30] Foreign Application Priority Data

May 9, 1991 [JP] Japan .................................. 3-102892
Jul. 7, 1992 [JP] Japan .................................. 4-178711

[51] Int. Cl.⁶ ...................... B01D 57/02; B01D 61/42
[52] U.S. Cl. ................... 204/300 R; 204/180.1; 204/299 R
[58] Field of Search ............. 204/299 R, 180.1, 300 R

[56] References Cited

U.S. PATENT DOCUMENTS

| 4,100,068 | 7/1978 | Jordan et al. | 204/300 R |
| 4,244,804 | 1/1981 | Moeglich | 204/300 R |
| 4,376,022 | 3/1983 | Porta et al. | 204/300 R X |

FOREIGN PATENT DOCUMENTS

| 0046155 | 2/1982 | European Pat. Off. | |
| 310681 | 9/1919 | Germany. | |
| 51-81454 | 7/1976 | Japan. | |
| 56-60604 | 5/1981 | Japan. | |
| 60-25597 | 2/1985 | Japan. | |
| 61-268310 | 11/1986 | Japan. | 204/300 R |
| 2-119906 | 5/1990 | Japan. | |

OTHER PUBLICATIONS

Patent Abstracts of Japan, vol. 14, No. 330 (C-741) 16 Jul. 1990 and JP-A-01 119 906 (Fuji Electric Co. Ltd.) May 1990, abstract only and Database WPI, Section CH, Week 9024, Derwent Publications Ltd., London, GB; AN 90-182420, abstract only.
Patent Abstracts on Japan; vol. 9, No. 200 (C-298) 16 Aug. 1985 and JP-A-60 068 020 9 Fuji Denki Sougou) 18 Apr. 1985, abstract only and Database WPI, Section Ch, Week 8522, Derwent Publications Ltd., London, GB; An 85-131200, abstract only.
Patent Abstracts of Japan, vol. 15, No. 202 (C-834) 23 May 1991 and JP-A-03 056 107 (Fuji Electric Co Ltd.) 11 Mar. 1991, abstract only and Database WPI, Section Ch, Week 9116, Derwent Publications Ltd., London, GB; An 91-114318, abstract only.

Primary Examiner—John Niebling
Assistant Examiner—John S. Starsiak, Jr.
Attorney, Agent, or Firm—Finnegan, Henderson, Farabow, Garrett & Dunner

[57] ABSTRACT

In an electro-endosmosis type dehydrator in which the voltage of an electric power source 6 is applied across a rotary drum 1 having electrodes on the cylindrical wall and a press belt 3 confronted through a sludge passageway 4 with the cylindrical wall of the rotary drum, and water contained in the sludge 8 supplied to the sludge passageway is collected on the side of the press belt and discharged therefrom. The electrodes (or electrode assembly 2) on the rotary drum are a plurality of wire electrodes 22 which are arranged on the cylindrical wall of the rotary drum in such a manner that they are in parallel with one another with degasifying slits therebetween, whereby the gas produced on the side of the rotary drum by electrolysis of the sludge during electro-endosmosis dehydration is quickly discharge out of the system through the degasifying slits.

26 Claims, 4 Drawing Sheets

ELECTRO-ENDOSMOSIS TYPE DEHYDRATOR

CROSS REFERENCE TO RELATED APPLICATIONS

This application is a continuation-in-part of U.S. application No. 07/854,475, filed on Mar. 17, 1992, now abandoned.

BACKGROUND OF THE INVENTION

This invention relates to an electro-endosmosis type dehydrator for dehydrating the sludge formed, for instance, in a sewage-treatment plant, and more particularly to the structure of electrodes provided for a rotary drum in an electro-endosmosis type dehydrator in which the rotary drum is combined with a press belt.

Such an electro-endosmosis dehydrator in which a rotary drum is combined with a press belt has been disclosed, for instance, in Japanese Patent Unexamined Publication No. Sho-56-60604. FIG. 9 shows the configuration of such a rotary drum type and electro-endosmosis type dehydrator. In FIG. 9, the reference numeral 101 represents a rotary drum also functioning as an anode; 102, a water-transmissive press belt also functioning as a cathode and confronted through a sludge passageway with the rotary drum 101; 103 and 104, filtrating cloth belts laid over the dehydrating area surfaces of the rotary drum 101 and the press belt 102; 105, a DC source; and 106, a filtrated water receptacle.

In such a configuration, if a voltage is applied across the rotary drum 101 and the press belt 102, and sludge 107 is supplied to the sludge passageway while the rotary drum 101 is being rotated in the arrow direction, the sludge 107 suffers a mechanical press force, and at the same time the water contained in the sludge is charged into + as the result of an electric field acting therein so that the water flows to the cathode side, passes through the filtrating cloth 104 and the press belt 102, and drops into the filtrated water receptacle 106 so as to be drained out of the system. The dehydrated sludge is recovered as a dehydrated cake. A portion of the water which has been pressed and passed out to the rotary drum side by the mechanical press force is passed through the filtrating cloth 103, and drained out of the system through an drainage groove formed in the drum surface.

The above-mentioned conventional electro-endosmosis type dehydrator is, however, disadvantageous in the following points: That is, the rotary drum 101 and the press belt 102 also used as electrodes are covered with the filtrating cloths 103 and 104 which are electrically insulating substances. Accordingly, the effective area of the electrodes which are brought into contact with the sludge is decreased (a current flows from the electrodes to the sludge through liquid permeating the texture of the filtrating cloths), so that the conductivity between the sludge 107 and the electrodes is lowered. In this regard, sludge contacting with the electrode includes enough water so that high conductivity is maintained between the electrode and the sludge on the cathode side where water is collected by electro-endosmosis. On the side of the rotary drum 1 acting as an anode, on the contrary, water contained in the sludge is moved to the cathode side with the advance of the electro-endosmosis so that the water containing rate of the sludge contacting with the electrode surface on the anode side decreases so that the specific superficial conductivity is lowered. Hence, it is more and more difficult to flow a current, so that the electro-endosmosis flow quantity, that is, the dehydrating ability is lowered (the electro-endosmosis flow quantity is proportional to a current flowing in the sludge).

To prevent the conductivity between electrodes and sludge from lowering on the anode side, there has been such a trial that the electrode surface of the rotary drum is brought into direct contact with the sludge without using such a filtrating cloth, as disclosed, for instance, by Japanese Patent Unexamined Publication No. Sho. 60-25597.

However, such modified electro-endosmosis type dehydrator also has the following disadvantages: When the sludge is dehydrated with such electro-endosmosis type dehydrator, the sludge produces gas in the dehydrator by electrolysis. The gas thus produced is electrically non-conductive. If the gas is held detained between the sludge and the electrode surface during dehydration, it will obstruct the application of voltage to the sludge, thus lowering the sludge dehydrating performance on electrolysis. In this case, the gas produced on the side of the press belt (where water is collected) is discharged out of the system together with the water filtered; whereas, the gas produced on the side of the rotary drum (where no water is collected) is enclosed between the sludge and the electrode surface. Hence, it is essential to quickly remove the gas from the rotary drum side; more specifically, the gas produced between the sludge and the electrode surface must be quickly discharged out of the system to prevent the lowering of the performance of electroendosmosis dehydration.

For this purpose, another electro-endosmosis type dehydrator has been proposed under Japanese Patent Unexamined Publication No. Hei. 2-119906 in which a plurality of degasifying strings are laid over the cylindrical wall of the rotary drum.

The electro-endosmosis type dehydrator with the degasifying strings is, however, disadvantageous in the following points: The strings are belts which are laid over the electrode surface of the rotary drum and a pulley. Therefore, the strings are driven in such a manner as to cut into the sludge. Hence, when the sludge is conveyed along the sludge passageway while being compressed, the degasifying passageways formed by the strings may not work being clogged up with sludge, or the sludge often shifts the strings from their predetermined positions to the right or left. The strings are made of insulating material. Therefore, if the number of strings is increased to improve the degasifying performance, then the effective area of the electrodes which are brought into contact with the sludge is decreased as much; that is, the electro-endosmosis is lowered as much.

SUMMARY OF THE INVENTION

In view of the foregoing, an object of this invention is to provide an electro-endosmosis type dehydrator in which the above-described difficulties accompanying conventional electro-endosmosis type dehydrators have been eliminated.

Another object of the present invention is to provide an electro-endosmosis type dehydrator having high performance of dehydrating, more particularly the structure of the electrode portion thereof, in which high conductivity is ensured between electrodes and sludge, and water contained in the sludge and gas generated in electrolysis can be quickly discharged out of the system.

In order to attain the above-noted and other objects, the present invention provides an electro-endosmosis type dehydrator for dehydrating sludge conveyed along a passageway by applying a voltage to the sludge, which includes: a rotary drum having a cylindrical wall; a press belt confronting the rotary drum; an electrode arranged over the cylindrical wall of the rotary drum and having first and second surfaces opposite to each other, the first surface being spaced from the press belt for defining a sludge passage with the press belt and kept in direct contact with the sludge in the sludge passage, the second surface being spaced from the cylindrical wall for defining a degasifying passage with the cylindrical wall; and means provided in the electrode for communicating the sludge passage with the degasifying passage, whereby a gas generated in the sludge passage is discharged from the sludge passage to the degasifying passage.

The electrode may be made up of a plurality of wire electrodes arranged on the cylindrical wall of the rotary shaft with a radial distance therefrom, to form, as the communicating means, a slit between each adjacent pair thereof.

It is also applicable that holes are formed through the cylindrical electrode. Preferably, an annular space, i.e. the degasifying passage, between the cylindrical wall of the rotary drum and the second surface of the cylindrical electrode is filled with a filtrating material, or otherwise the holes are filled with filtrating material.

The degasifying passage and the communicating means also function to discharge water contained in the sludge out of the system.

BRIEF DESCRIPTION OF THE DRAWINGS

In the accompanying drawings:

FIGS. 7A and 7B are diagrams of the configuration of a rotary drum type electro-endosmosis type dehydrator according to a third embodiment, in which FIG. 7A is a sectional view of a rotary drum portion, and FIG. 7B is a partially expanded diagram of a main portion in FIG. 7A;

FIGS. 8A and 8B are diagrams of the configuration of a rotary drum type electro-endosmosis type dehydrator according to a fourth embodiment of this invention, in which FIG. 8A is a sectional view of a rotary drum portion, and FIG. 8B is a diagram of the configuration of a wick in FIG. 8A.

DETAILED DESCRIPTION OF THE PREFERRED EMBODIMENTS

Figure 1:
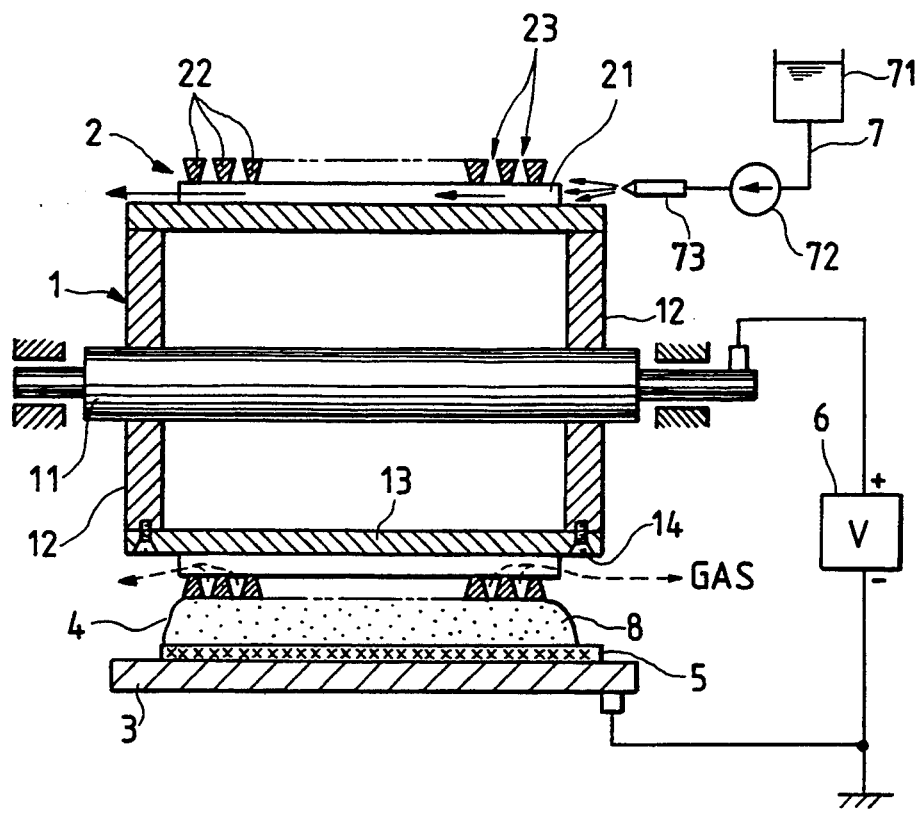
FIG. 1 is a sectional view showing the arrangement of an example of an electro-endosmosis type dehydrator which constitutes a first embodiment of this invention.
Figure 2:
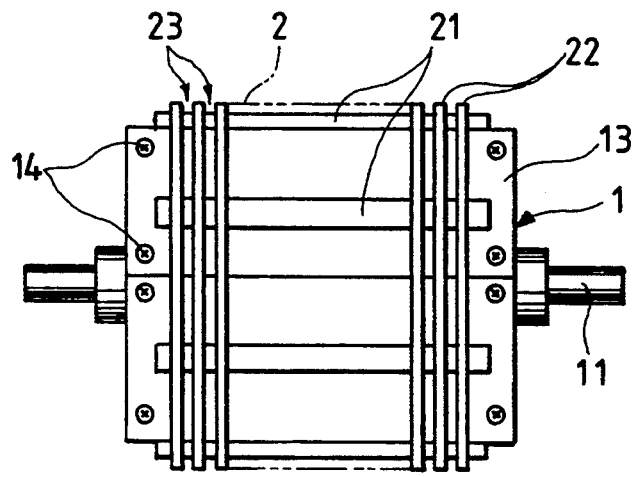
FIG. 2 is a side view of a rotary drum in the dehydrator shown in FIG. 1.
Figure 3:
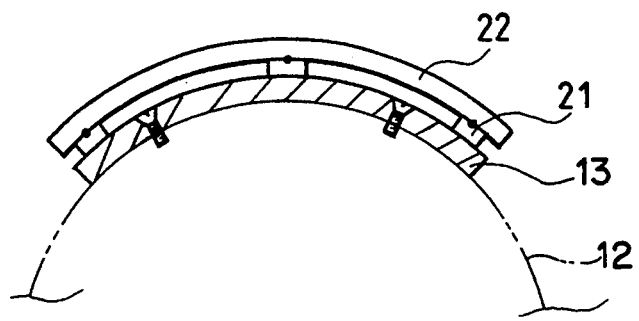
FIG. 3 is a side view showing one of the arcuate blocks into which an electrode assembly has been divided.

A first embodiment of this invention will be described hereafter in detail.

In an electro-endosmosis type dehydrator of the first embodiment of the invention, the electrodes on the rotary drum are a number of wire electrodes which are arranged on the cylindrical wall of the rotary drum in such a manner that they are in parallel with one another with degasifying slits therebetween.

In the dehydrator, in order to prevent the degasifying slits from being clogged up, the wire electrodes are trapezoidal in section, and are arranged on the cylindrical wall of the rotary drum with the shorter of the two parallel bases of the trapezoid set closer to the central axis of the rotary drum. Furthermore, in order that the electrodes are installed on the rotary drum or replaced with ease, the electrode assembly is divided into a plurality of arcuate blocks; that is, those arcuate blocks are installed on the cylindrical wall of the rotary drum to form the electrode assembly.

In order to remove the sludge which, passing through the degasifying slits, has deposited in the space under the electrode assembly arranged on the cylindrical wall of the rotary drum, the electro-endosmosis type dehydrator of the invention has a washing means for jetting water into the space under the electrode assembly.

In the dehydrator thus designed, the gas produced between the sludge and the electrode surface of the rotary drum by electrolysis during dehydration is allowed to flow through the degasifying slits (for instance about 5 $\mu$m) between the wire electrodes forming the electrode assembly into the space under the electrodes and then discharged out of the system. The wire electrodes are trapezoidal in section, and are arranged on the cylindrical wall of the rotary drum with the shorter of the two parallel sides of the trapezoid set closer to the central axis of the rotary drum. Hence, each of the degasifying slits formed between the wire electrodes is larger in width towards the central axis of the rotary drum. Therefore, even if the sludge particles go in the degasifying slits, they can go through the latter with ease, so that the slits will never be clogged up with the sludge. As the dehydration advances, the sludge may be deposited in the degasifying slits. In this case, the washing means is operated to jet water into the space under the electrodes to remove the sludge from the degasifying slits. On the other hand, the electrode assembly is divided into a plurality of arcuate blocks. Hence, electrode assembly can be readily installed on the rotary drum, and it can be replaced with ease.

The dehydrator according to the first embodiment is described in detail with reference to the accompanying drawings.

In FIGS. 1 through 4, reference numeral 1 designates a rotary drum; 2, an electrode assembly mounted on the cylindrical wall of the rotary drum; 3, a press belt in the form of a caterpillar which is confronted through a sludge passageway 4 with the electrode assembly on the rotary drum 1; 5, a filtering cloth belt laid over the press belt 3; 6, a DC source for applying voltage between the rotary drum 1 and the press belt 3; 7, washing means for washing the electrode assembly 2; and 8, sludge supplied to the sludge passageway. The arrangement and the sludge dehydrating operation of the electro-endosmosis type dehydrator are disclosed, for instance, by Japanese Patent Unexamined Publication No. Sho. 60-25597 in more detail.

Figure 4:
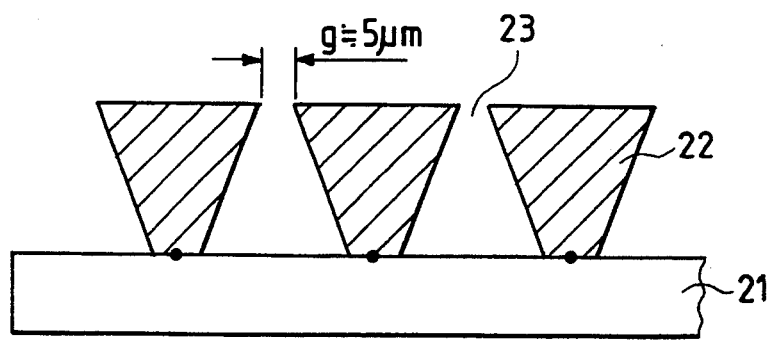
FIG. 4 is an enlarged diagram showing the arrangement of wire electrodes included in the dehydrator shown in FIG. 1.

The rotary drum 1 comprises: a rotary shaft 11; two disk-shaped brackets 12 mounted on the right and left end portion of the rotary shaft 11; and an electrode mounting board 13 laid over the two brackets 12. The electrode assembly 2 comprises: spacers 21 arranged on the cylindrical wall of the drum as cross ties; and a number of wire electrodes 22 laid over the spacers in such a manner that they are in parallel with one another and form small gaps about 5 $\mu$m in width, namely, degasifying slits 23 therebetween. The wire electrodes 22 are for instance titanium wires which are trapezoidal in section as shown in FIG. 4. With the shorter of the two parallel bases of the trapezoid on the spacer 21, each wire electrode 22 is spot-welded to the latter 21.

Figure 5:
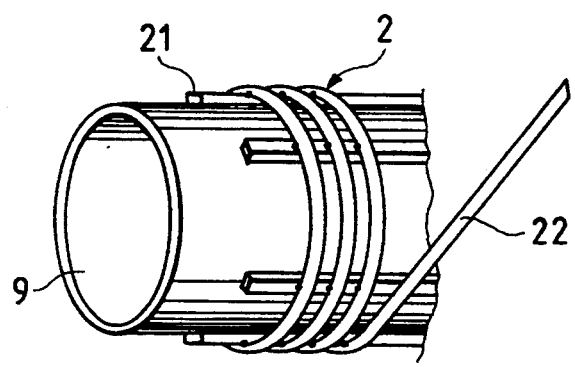
FIG. 5 is a perspective view for a description of a method of forming the electrode assembly.

The above-described electrode assembly 2 is formed for instance as follows: As shown in FIG. 5, a bobbin 9 is prepared which is equal in outside diameter to the rotary drum, and the spacers like cross ties are arranged on the bobbin 9 at predetermined intervals, and temporarily secured to it. A wire electrode 22 is wound over the spacers 21, and spot-welded to the latter 21 at the intersections. Thereafter, the electrode assembly 2 is removed from the bobbin 9. Under this condition, the electrode assembly 2 is divided into a plurality of arcuate blocks by cutting the wire electrodes 22 at equal angular intervals. Correspondingly, the electrode mounting board 13 of the rotary drum 1 is divided into a plurality of arcuate segments in compliance with the electrode assembly arcuate blocks. The electrode assembly arcuate blocks are fixedly mounted on the electrode mounting board arcuate segments, and then the latter are arranged to form the cylindrical wall of the rotary drum 1, and secured to the brackets 12 with bolts 14. The electrode assembly 2 thus secured is coated with platinum or iridium oxide so as to be insoluble.

The aforementioned washing means 7 comprises: a washing water tank 71; a pump 72 connected to a pipe line extended from the water tank 71; and a nozzle 73 for jetting washing water. The nozzle 73 is so positioned as to jet washing water towards the electrode assembly 2; more specifically, the nozzle jets water into the space under the wire electrodes 22; that is, the gap between the electrode mounting board 13 and the wire electrodes 22 which are spaced from each other by the spacers 21.

The operation of the dehydrator thus construction will be described. First, voltage is applied across the rotary drum 1 and the press belt 3, and the press belt 3 is driven. Under this condition, sludge 8 is supplied to the sludge passageway 4. In this case, the electrodes on the rotary drum and the press belt forman electric field between them, as a result of which electro-endosmosis acts on the sludge 8, so that the charged sludge containing water is moved towards the press belt 3, and the liquid passed through the filtrating cloth belt 5 is discharged out of the system through draining holes formed in the press belt 3. On the other hand, during the electroendosmosis dehydration, the sludge produces gas electrolytically. A part of the gas thus produced, which is on the side of the electrode surface of the rotary drum 1, will not cover the surfaces of the electrodes, being enclosed between the electrode surface of the rotary drum 1 and the sludge 8; that is, it flows quickly into the space under the electrode assembly 2 through the degasifying slits 23 formed between the wire electrodes 22, thus being discharged into the air around the dehydrator.

Each of the degasifying slits 23 is small in width, about 5 $\mu$m, and each of the wire electrodes 22 is trapezoidal in section as shown in FIG. 4. That is, the degasifying slits are larger in width towards the space under the electrodes. On the other hand, the sludge 8 moving along the sludge passageway is generally more than 10 $\mu$m in particle size. Hence, it is substantially impossible for the sludge 8 to pass through the degasifying slits 23 into the rotary drum during dehydration. Even if sludge particles smaller than 5 $\mu$m in particle size go in the degasifying slits 23, they will flow into the space under the electrodes together with the discharge gas without clogging the degasifying slits 23, because the slits are larger in width towards the space under the electrodes as was described above. When the dehydration is carried out repeatedly, sludge particles may go into the degasifying slits and deposit in the space under the electrode assembly 2. The sludge particles thus deposited can be washed away by operating the washing means 7; that is, they may be removed from the space under the electrodes and from the degasifying slits 23 by jetting water with the nozzle 73 of the washing means 7. On the other hand, when the dehydrator is used repeatedly or run for a long time, the wire electrodes 22 of the rotary drum 1 may be worn out or broken. In this case, the wire electrodes can be replaced with new ones readily and quickly, because the electrode assembly 2 is made up of the arcuate blocks which can be removed from the rotary drum.

As was described above, the gas generated during electro-endosmosis dehydration is quickly discharged out of the system through the degasifying slits of the electrode assembly. Hence, the electro-endosmosis type dehydrator is free from the difficulty that the gas is detained in the dehydrator, thus obstructing the application of voltage to the sludge; that is, the dehydrator operates with high efficiency. The present inventors have performed tests for evaluation, and found the following facts: With the conventional electro-endosmosis type dehydrator, in order to dehydrate the sludge as required, it is necessary to apply 110 volts; whereas, with the electroendosmosis type dehydrator of the invention in which the electrode assembly is designed as described above, the same effect can be obtained with 80 volts. In the case where the width of the degasifying slits are set to 5 $\mu$m, the quantity of sludge passing through the electrode assembly is considerably small; more specifically, even when the electro-endosmosis type dehydrator is operated fully for twenty-four hours, the degasifying function is maintained satisfactory by cleaning the dehydrator only once a day.

As was described above, in the electro-endosmosis type dehydrator of the first embodiment of the invention, the electrode assembly on the rotary drum is made up of a number of wire electrodes which are arranged on the cylindrical wall of the rotary drum in such a manner that they are in parallel with one another with the degasifying slits therebetween. Hence, the gas generated during electro-endosmosis dehydration is quickly discharge out of the system through the degasifying slits formed between the wire electrodes, with the result that the difficulty is eliminated that the gas is detained in the dehydrator to obstruct the application of voltage to the sludge. That is, the electro-endosmosis type dehydrator of the invention operates with high efficiency. Furthermore, in the dehydrator of the invention, the slits functioning as degasifying passageways are formed in the electrode assembly. This solves the problem accompanying the conventional electroendosmosis type dehydrator in which the degasifying strings are provided on the cylindrical wall of the rotary drum, thus ensuring high reliability in the operation.

Figure 6:
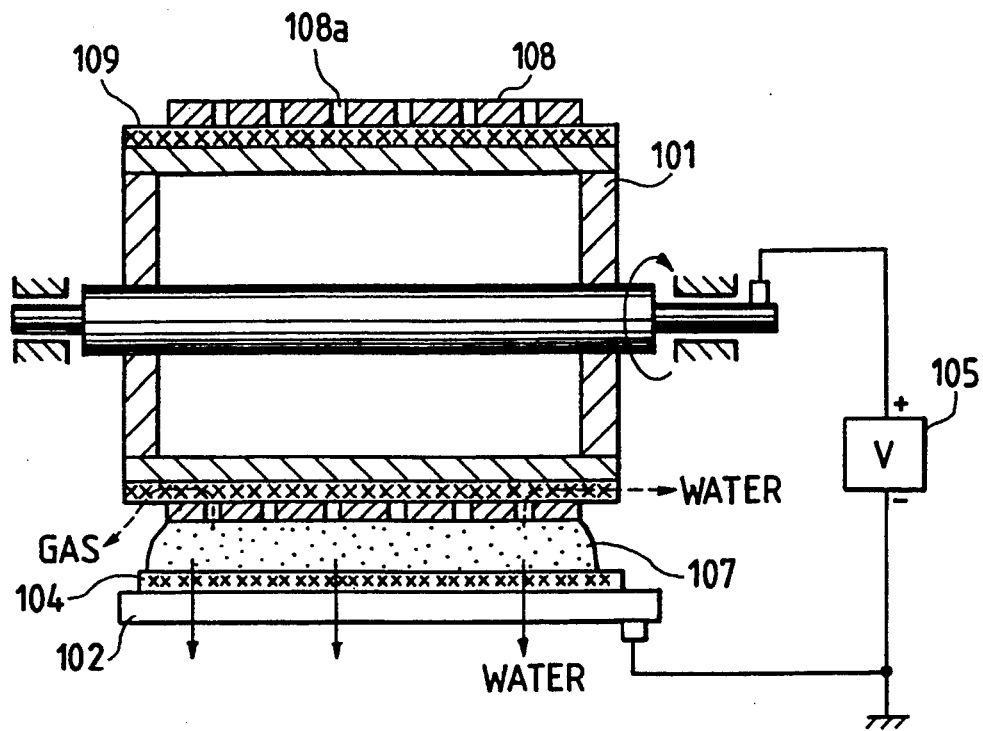
FIG. 6 is a sectional view of the configuration of a rotary drum type electro-endosmosis type dehydrator which constitutes a second embodiment of this invention.

Next, second, third and fourth embodiments of the present invention will be described in detail with reference to FIGS. 6 through 8. In FIGS. 6 through 8, parts the same as those in FIG. 9 are referenced correspondingly.

FIG. 6 shows an electro-endosmosis type dehydrator according to a second embodiment of the present invention, in which the cylindrical wall of a rotary drum 101 is coated or covered with an electrode plate (anode) 108 through a filtrating material 109 wider than the electrode plate. Dewaterifying/degasifying holes 108a are scatteringly formed through the plate surface of the electrode plate 108. The dewaterifying/degasifying holes 108a are formed through punching so that they are, for example, circular holes which have a diameter of 3.5 mm and which are arranged at intervals of 30 mm pitch. The filtrating material 109 is, for example, a nonwoven cloth being made of polypropylene fiber and having a thickness of about 5 mm. Without using the filtrating cloth 103 shown in FIG. 9, the rotary drum 101 is driven so that the surface of the electrode plate 108 is in direct contact with sludge 107 supplied to a sludge passageway.

In such a configuration, if the sludge 107 is supplied to the sludge passageway between electrodes while a DC voltage is being applied across the anode-side electrode plate 108 covering the rotary drum 101 and a cathode-side press belt 102, water contained in the sludge is moved toward the cathode-side press belt 102 by electro-endosmosis, and discharged out of the system through the filtrating cloth 104. In this case, the anodeside electrode plate 108 is in direct contact with the sludge 107 without any filtrating cloth (insulating substance) laid between the electrode plate 108 and the sludge 107, so that high conductivity is ensured therebetween. As a result of tests carried out by the third embodiment of the present inventor for evaluation about this point, it was observed that the ability of electroendosmosis was improved so much as the conductivity between the electrodes and the sludge was made higher, and it was confirmed that the applied voltage could be reduced from 100 V to 70 V and the power consumption could be reduced so much in order to obtain the ability of electroendosmosis equivalent to that in the conventional system (in FIG. 9).

On the other hand, the exuded water pressed out toward the electrode plate 108 of the rotary drum 101 from the sludge 107 by the mechanical press force in this dehydrating process, and the gas generated by electrolysis are passed out to the back side of the electrode plate through the dewaterifying/degasifying holes 108a opened through the electrode plate 108, and thereafter quickly discharged outside (to the side of the rotary drum) through the filtrating material 109. Sludge particles and so on put in the dewaterifying/degasifying holes 108a of the electrode plate 108 together with the exuded water are caught by the filtrating material 109 so that they cannot escape outside at all.

Figure 7A:
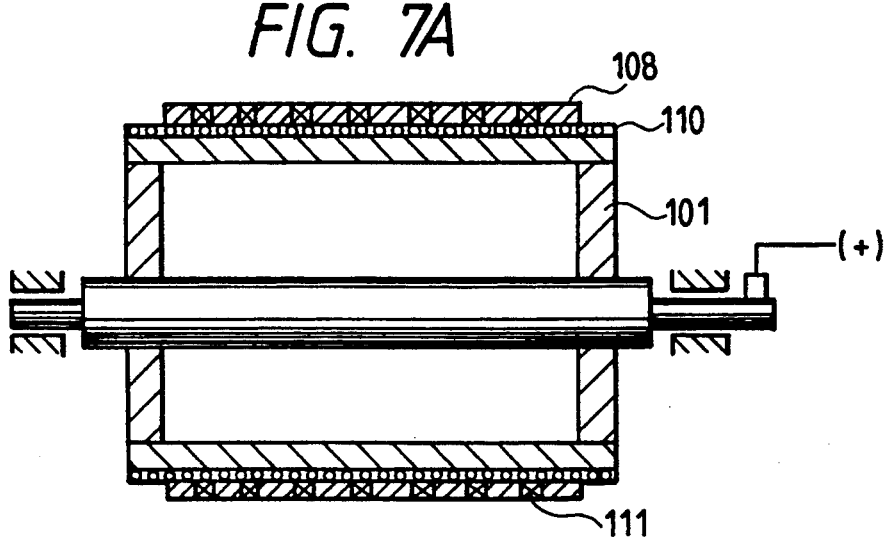
Figure 7B:
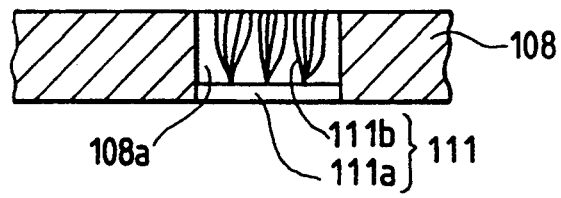

FIGS. 7A and 7B show an electro-endosmosis type dehydrator according to a third embodiment of the present invention. This embodiment is an example of application of the above-mentioned second embodiment, in which the cylindrical wall of the rotary drum 101 is covered with an electrode plate 108 through a net 110 made of, for example, polypropylene fiber. Each of the dewaterifying/degasifying holes 108a formed through the electrode plate 108 is filled with a filtrating material 111. Nylon fiber planted in a support 111a as shown in FIG. 7B is used as this filtrating material 111.

In such a configuration, the exuded water and the generated gas collected near the surface of the electrode plate 108 in the same manner as in the second embodiment are passed out to the back side of the electrode plate through the dewaterifying/degasifying holes 108a, and thereafter quickly discharged outside through the net 110. Sludge particles are caught by the filtrating material 111 so that they cannot escape outside through the dewaterifying/degasifying holes 108a at all.

Figure 8A:
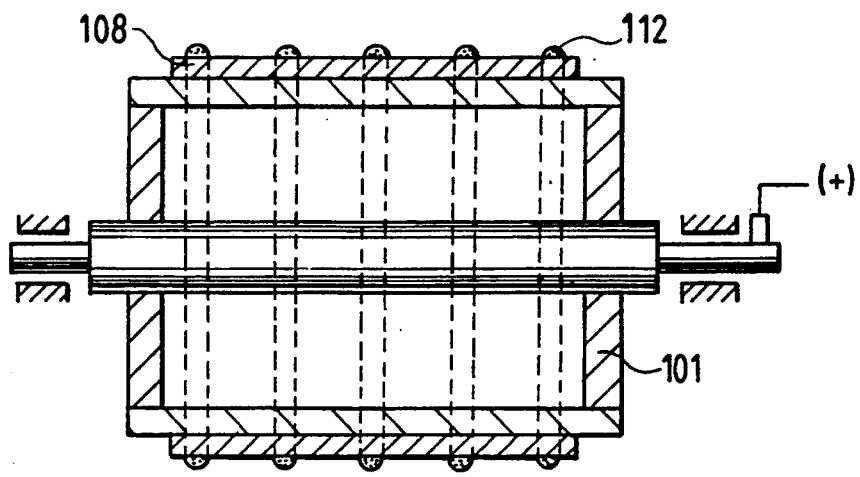
Figure 8B:
Figure 9:
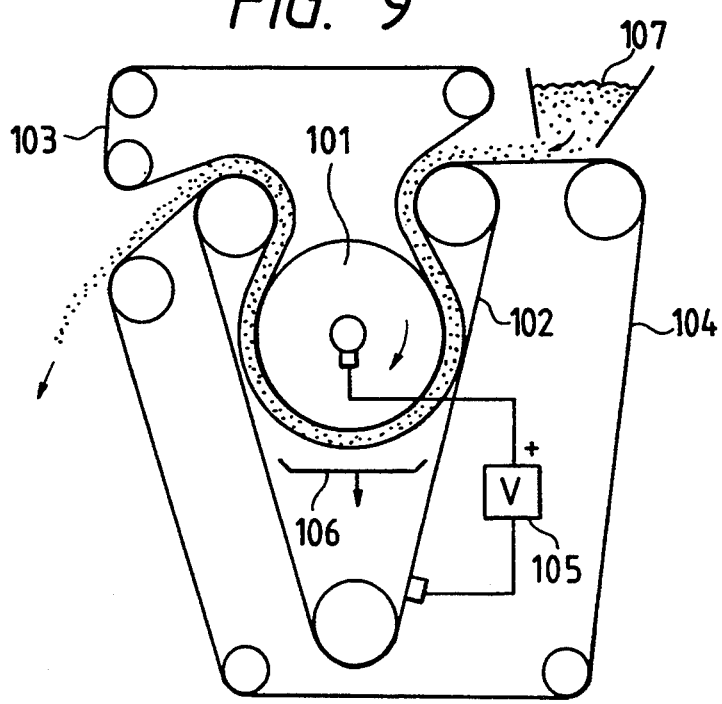
FIG. 9 is a schematic diagram of the whole configuration of a conventional rotary drum type and electro-endosmosis type dehydrator.

FIGS. 8A and 8B show an electro-endosmosis type dehydrator according to a fourth embodiment of the present invention, in which a plurality of wicks 112 respectively having a capillary tube function as a bandlike filtrating material are scatteringly wound at intervals of suitable pitch on the cylindrical wall of an electrode plate 108 covering the outer cylindrical wall of a rotary drum 101. Each wick 112 is constituted by, for example, a bundle 112a of polypropylene fibers having a thickness of about 0.3 mm, the bundle 112a being bundled with fibers 112b of the same kind, as shown in FIG. 8B. The wicks 112 are wound and fixed on the electrode plate 108.

In such a configuration, the exuded water and the generated gas collected near the surface of the electrode plate 108 of the rotary drum 101 during electro-endosmosis dehydration are led to the upper side (not contacting with sludge) of the rotary drum through the gaps (capillary tubes) in the fiber bundles of the wicks 112, and discharged into the circumference therefrom. The wicks 112 linearly cover a very small area of the surface of the electrode plate 108, so that the effective area of the electrodes concerning with the conductivity to the sludge hardly suffers influence therefrom, so that it is possible to ensure high conductivity to the sludge.

In the respective configurations of the above-mentioned embodiments of the present invention, first, the electrodes contact with the sludge directly through no filtering cloth, so that the effective area of the electrodes taking part in the conductivity between the electrodes and sludge is made so large that high conductivity can be ensured.

Further, the water passed out from the sludge by the mechanical press or the like and collected on the electrode surface of the anode, and the gas generated in the electrolysis of water contained in the sludge are quickly discharged outside. If the above-mentioned configurations are applied to the cathode as well as the anode, they can act effectively.

As was described above, in the electro-endosmosis type hydrator of the present invention, the whole of the surface of any electrode is not covered with filtrating cloth, but is made to be in contact with sludge directly to ensure high conductivity between the electrode and the sludge, and water collected on the electrode, and gas generated therefrom can be quickly discharged out of the system, so that the efficiency of the electroendosmosis type dehydrator can be improved on a large scale.

What is claimed is:

1. An electro-endosmosis type dehydrator in which voltage is applied across a rotary drum having electrodes on the cylindrical wall thereof and a press belt confronted through a sludge passageway with the cylindrical wall of said rotary drum, and water contained in sludge supplied to said sludge passageway is collected on the side of said press belt and discharged therefrom, wherein said electrodes on said rotary drum are a plurality of wire electrodes which are arranged on the cylindrical wall of said rotary drum in such a manner that said wire electrodes are in parallel with one another to form degasifying slits therebetween, through which gas generated from said sludge in said sludge passageway is discharged therefrom, and wherein said wire electrodes are trapezoidal in section, and are arranged on the cylindrical wall of said rotary drum with the shorter of the two parallel bases of the trapezoid set closer to the center of said rotary drum.

2. An electro-endosmosis type dehydrator in which voltage is applied across a rotary drum having electrodes on the cylindrical wall thereof and a press belt confronted through a sludge passageway with the cylindrical wall of said rotary drum, and water contained in sludge supplied to said sludge passageway is collected on the side of said press belt and discharged therefrom, wherein said electrodes on said rotary drum are a plurality of wire electrodes which are arranged on the cylindrical wall of said rotary drum in such a manner that said wire electrodes are in parallel with one another to form degasifying slits therebetween, through which gas generated from said sludge in said sludge passageway is discharged therefrom, and wherein said rotary drum includes an electrode assembly, which is divided into a plurality of arcuate blocks, said arcuate blocks being mounted on the cylindrical wall of said rotary drum.

3. An electro-endosmosis type dehydrator in which voltage is applied across a rotary drum having electrodes on the cylindrical wall thereof and a press belt confronted through a sludge passageway with the cylindrical wall of said rotary drum, and water contained in sludge supplied to said sludge passageway is collected on the side of said press belt and discharged therefrom, wherein said electrodes on said rotary drum are a plurality of wire electrodes which are arranged on the cylindrical wall of said rotary drum in such a manner that said wire electrodes are in parallel with one another to form degasifying slits therebetween, through which gas generated from said sludge in said sludge passageway is discharged therefrom, and wherein washing means for jetting washing water to the space under an electrode assembly is arranged on the cylindrical wall of said rotary drum, to remove sludge therefrom.

4. An electro-endosmosis type dehydrator in which sludge is conveyed along a sludge passageway while being dehydrated; said dehydrator comprising:
a rotary drum including a cylindrical wall, spacers arranged on the cylindrical wall as cross ties, and a wire electrode spirally wound around said cylindrical wall over said spacers to form degasifying slits and fixed to said spacers at the intersections to be positioned slightly apart from said cylindrical wall;
a press belt confronted with said rotary drum for defining said sludge passageway therebetween, at least one of said rotary drum and said press belt being driven to convey said sludge along said sludge passageway; and
means for applying voltage to said wire electrode and said press belt so that water contained in said sludge supplied to said sludge passageway is collected on a side of said press belt, wherein gas generated from said sludge by electrolysis is discharged through said degasifying slits and a space between said cylindrical wall and said wire electrode.

5. The dehydrator according to claim 4, wherein said wire electrode is trapezoidal in section, and is fixed to said spacers with the shorter of the two parallel bases of the trapezoid set closer to the center of said rotary drum.

6. The dehydrator according to claim 4, wherein said cylindrical wall is divided into a plurality of arcuate electrode mounting boards.

7. The dehydrator according to claim 4, further comprising:
washing means for jetting washing water to the space between said cylindrical wall and said wire electrode to remove sludge therefrom.

8. An electro-endosmosis type dehydrator for dehydrating sludge conveyed along a passageway by applying a voltage to the sludge, comprising:
a rotary drum having a cylindrical wall;
a press belt confronting the rotary drum to form a passageway with the cylindrical wall;
a wire electrode helically arranged above the cylindrical wall, wherein the wire electrode forms degasifying slits; and
a plurality of terminals for applying a voltage between the wire electrode and press belt, wherein one terminal is coupled to the wire electrodes and a second terminal is coupled to the press belt.

9. An electro-endosmosis type dehydrator according to claim 8, further comprising:
spacers arranged on the cylindrical wall as cross ties, wherein the wire electrode is wound over said spacers and fixed to spacers at intersections to form an electrode assembly.

10. An electro-endosmosis type dehydrator according to claim 9, wherein said cylindrical wall is divided into a plurality of mounting segments, wherein the electrode assembly is divided into a plurality of arcuate blocks, wherein the arcuate blocks being fixedly mounted on the mounting segments.

11. An electro-endosmosis type dehydrator according to claim 4, wherein the wire electrode is trapezoidal in section, wherein the sorter of the two parallel bases of the trapezoid is set closer to the center of the rotary drum.

12. An electro-endosmosis type dehydrator according to claim 4, further comprising:
washing means for removing sludge from the space between the cylindrical wall and the wire electrode.

13. An electro-endosmosis type dehydrator for dehydrating sludge conveyed along a passageway by applying a voltage to the sludge, comprising:
a rotary drum having a cylindrical wall;
a press belt confronting the rotary drum;
an electrode arranged over the cylindrical wall of the rotary drum and having a first surface and a second surface opposite to the first surface, the first surface being spaced from the press belt for defining a sludge passage with the press belt and kept in direct contact with the sludge in the sludge passage, the second surface being spaced from the cylindrical wall for defining a degasifying passage with the cylindrical wall; and
means provided in the electrode for communicating the sludge passage with the degasifying passage, whereby a gas generated in the sludge passage is discharged from the sludge passage to the degasifying passage.

14. An electro-endosmosis type dehydrator according to claim 13, wherein the electrode includes a plurality of wire electrodes arranged on the cylindrical wall of the rotary drum with a radial distance therefrom, and the communicating means includes a slit formed between adjacent pair of the wire electrodes.

15. The dehydrator according to claim 14, wherein each of said wire electrodes extends in a circumferential direction with respect to said rotary drum.

16. An electro-endosmosis type dehydrator according to claim 13, wherein the communicating means includes dewaterifying/degasifying holes formed through the electrode.

17. An electro-endosmosis type dehydrator according to claim 16, wherein the degasifying passage is filled with a filtrating material.

18. An electro-endosmosis type dehydrator according to claim 16, wherein the dewaterifying/degasifying holes are filled with filtrating material.

19. The dehydrator according to claim 13, wherein said communicating means includes means for positively preventing said sludge from entering into said degasifying passage while permitting said gas to be discharged from said sludge passage to said degasifying passage.

20. The dehydrator according to claim 19, wherein said preventing and permitting means includes a slit formed in said electrode.

21. The dehydrator according to claim 13, wherein said gas generated in said sludge passage is discharged from said sludge passage to said degasifying passage through said communication means when said sludge is subjected to pressure between said rotary drum and said press belt.

22. An electro-endosmosis type dehydrator including a rotary drum in which a DC voltage is applied across an anode having an electrode plate and a cathode confronted with each other through a space as a sludge passageway, and water contained in sludge supplied to said space is collected on said cathode side by electroendosmosis and discharged out of the system, wherein said anode is contacted with said sludge directly, dewaterifying/degasifying holes are scatteringly formed through said electrode plate, and a filtrating material is tightly put on the back surface side of said electrode plate and between said rotary drum and said electrode plate to cover said dewaterifying/degasifying holes.

23. An electro-endosmosis type dehydrator in which DC voltage is applied across an anode having an electrode plate and a cathode confronted with each other through a space as a sludge passageway, and water contained in sludge supplied to said space is collected on the side of said cathode by electroendosmosis and discharged out of the system, wherein said anode is contacted with said sludge directly, dewaterifying/degasifying holes are scatteringly formed through said electrode plate, and each of said dewaterifying/degasifying holes is filled with a filtrating material.

24. An electro-endosmosis type dehydrator in which DC voltage is applied across an anode having an electrode plate and a cathode confronted with each other through a space as a sludge passageway, and water contained in sludge supplied to said space is collected on the side of said cathode by electroendosmosis and discharged out of the system, wherein said anode is contacted with said sludge directly, and band-like filtrating materials with their one-side ends drawn outside and having capillary tube functions are scatteringly arranged on the surface of said electrode plate of said electrode plate on the side thereof contacting with said sludge.

25. An electro-endosmosis type dehydrator in which voltage is applied across a rotary drum having electrodes on the cylindrical wall thereof and a press belt confronted through a sludge passageway with the cylindrical wall of said rotary drum, and water contained in sludge supplied to said sludge passageway is collected on the side of said press belt and discharged therefrom, wherein said electrodes on said rotary drum are a plurality of wire electrodes which are arranged on the cylindrical wall of said rotary drum in such a manner that said Wire electrodes are in parallel with one another to form degasifying slits therebetween, through which gas generated from said sludge in said sludge passageway is discharged therefrom, and wherein said electrodes are radially spaced from said cylindrical wall of said rotary drum for forming a degasifying passage and parallely spaced from each other for preventing said sludge from entering said degasifying passage.

26. An electro-endosmosis type dehydrator in which voltage is applied across a rotary drum having electrodes on the cylindrical wall thereof and a press belt confronted through a sludge passageway with the cylindrical wall of said rotary drum, and water contained in sludge supplied to said sludge passageway is collected on the side of said press belt and discharged therefrom, wherein said electrodes on said rotary drum are a plurality of wire electrodes which are arranged on the cylindrical wall of said rotary drum in such a manner that said wire electrodes are in parallel with one another to form degasifying slits therebetween, through which gas generated from said sludge in said sludge passageway is discharged therefrom, and wherein each of said electrodes extends in a circumferential direction with respect to said rotary drum.

* * * * *

UNITED STATES PATENT AND TRADEMARK OFFICE
CERTIFICATE OF CORRECTION

PATENT NO. : 5,401,375
DATED : March 28, 1995
INVENTOR(S) : Mikimasa YAMAGUCHI et al It is certified that error appears in the above-indentified patent and that said Letters Patent is hereby corrected as shown below:

Abstract, Front Page, Line 16 "discharge" should read --discharged--.

Claim 10, Column 10, Line 40 "being" should read --are--.

Claim 11, Column 10, Line 43 "4" should read --8--.

Claim 12, Column 10, Line 48 "4" should read --8--.

Claim 23, Column 12, Line 1 "electroendosmosis" should read --electro-endosmosis--.

Claim 24, Column 12, Line 12 "electroendosmosis" should read electro-endosmosis--.

Claim 25, Column 12, Line 31, "Wire" should read --wire--.

Signed and Sealed this

Third Day of October, 1995

Attest:

BRUCE LEHMAN

Attesting Officer

Commissioner of Patents and Trademarks